(12) United States Patent
Beck (10) Patent No.: US 7,350,343 B2
(45) Date of Patent: Apr. 1, 2008

(54) SYSTEM FOR AUTOMATICALLY STEERING A UTILITY VEHICLE

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 867 days.

(21) Appl. No.: 10/173,465

(22) Filed: Jun. 14, 2002

(65) Prior Publication Data

US 2002/0189220 A1 Dec. 19, 2002

(30) Foreign Application Priority Data

Jun. 16, 2001 (DE) .................................. 101 29 136

(51) Int. Cl.
*A01D 41/127* (2006.01)

(52) U.S. Cl. .................................................. 56/10.2 R
(58) Field of Classification Search ............. 56/10.2 R, 56/10.2 D, 10.2 F; 404/84.05; 180/421–423; 280/81.6

See application file for complete search history.

(56) References Cited

U.S. PATENT DOCUMENTS

| | | | | |
|---|---|---|---|---|
| 3,946,825 A | * | 3/1976 | Gail ............................ | 180/401 |
| 4,015,366 A | * | 4/1977 | Hall, III ....................... | 47/1.43 |
| 4,228,636 A | | 10/1980 | Homburg ..................... | 56/10.2 |
| 4,558,760 A | * | 12/1985 | Lestradet .................. | 56/10.2 F |
| 4,868,752 A | * | 9/1989 | Fujii et al. ..................... | 701/28 |
| 5,043,902 A | * | 8/1991 | Yokoyama et al. .......... | 701/211 |
| 5,132,695 A | * | 7/1992 | Dumas et al. ............... | 342/461 |
| 5,234,070 A | * | 8/1993 | Noah et al. .................. | 180/169 |
| 5,715,665 A | * | 2/1998 | Diekhans et al. .......... | 56/10.2 F |
| 5,752,374 A | | 5/1998 | Allworden et al. ............ | 56/341 |
| 5,911,669 A | * | 6/1999 | Stentz et al. ............... | 56/10.2 F |
| 5,928,309 A | * | 7/1999 | Korver et al. ............... | 701/214 |
| 6,095,254 A | | 8/2000 | Homburg ......................... | 172/6 |
| 6,101,795 A | * | 8/2000 | Diekhans ................. | 56/10.2 F |
| 6,119,442 A | * | 9/2000 | Hale ......................... | 56/10.2 H |
| 6,128,574 A | | 10/2000 | Diekhans ..................... | 701/209 |
| 6,377,881 B1 | * | 4/2002 | Mullins ................... | 56/10.2 F |
| 6,397,569 B1 | * | 6/2002 | Homburg et al. .......... | 56/10.2 F |

FOREIGN PATENT DOCUMENTS

| | | |
|---|---|---|
| DE | 195 30 356 A1 | 4/1997 |
| DE | 196 29 618 A1 | 1/1998 |
| DE | 197 43 884 | 4/1999 |
| DE | 198 58 157 A1 | 6/2000 |
| DE | 198 58 168 A1 | 6/2000 |
| EP | 0 821 296 A2 | 1/1998 |
| EP | 0 878 121 A1 | 11/1998 |
| EP | 0 887 660 | 12/1998 |
| EP | 0 887 660 A2 | 12/1998 |
| EP | 1 002 455 | 5/2000 |
| EP | 1 002 455 A2 | 5/2000 |
| FR | 2619639 A1 * | 2/1989 |
| WO | 00/08484 | 2/2000 |

* cited by examiner

*Primary Examiner*—Thomas B. Will
*Assistant Examiner*—Alicia Torres (57) ABSTRACT

A system for automatically steering a utility vehicle having an operating implement. The system comprises a controller that is in communication with a scanning sensor. The controller receives an output signal from the scanning sensor and generates a steering signal that is directed to a steering controller for automatically steering the vehicle along a boundary of operation detected by the scanning sensor. The controller is supplied with information on which side of the operating implement the boundary of operation is located. The controller controls the scanning region of the scanning sensor as a function of this information.

19 Claims, 4 Drawing Sheets

SYSTEM FOR AUTOMATICALLY STEERING A UTILITY VEHICLE

FIELD OF THE INVENTION

The present invention is directed to a system for automatically steering a utility vehicle having an operating implement. It is particularly well suited for a utility vehicle. The system comprises a scanning sensor having a scanning field for scanning a boundary of operation. The scanning field is controlled by information on which side of the operating implement the boundary of operation is located and its expected location stored in memory.

BACKGROUND OF THE INVENTION

EP 0 878 121 A discloses a harvesting machine that can be steered automatically along a crop edge which is scanned with a laser scanning sensor ahead of the harvesting machine. The laser scanning sensor measures, according to the propagation time principle, the distance to the point at which the radiation emitted by the scanning sensor is reflected. On the basis of the position of the crop edge associated with a step-wise change in the distance and its target position, a steering signal is generated that is conducted to a steering controller. In the illustrated embodiments, the laser scanning sensor is attached to the cutter head above the crop edge, but may also be attached to the harvesting machine, on the operator's cab.

EP 0 887 660 A discloses a harvesting machine that is equipped with a laser scanning sensor arranged on the operator's cab. The laser scanning sensor is used for automatically steering the harvesting machine along the crop and/or for determining the amount of crop taken up by the harvesting machine. If the scanning sensor is used during the cereal crop harvest for determining the amount of the crop being taken up by the harvesting machine, the boundaries of the harvesting platform are associated with a pivot angle of the scanning sensor. If a sudden change occurs in this pivot angle region, this leads to the conclusion that a crop edge exists. During plowing the position of the frame of the plow can be determined by a sensor arranged on the plow. On the basis of the output signal of the sensor, the steering arrangement is supplied with a transverse offset distance corresponding to the immediate direction of the operation. In this way the steering arrangement considers the transverse offset of the plow from the tractor. The scanning region of the laser scanning sensor, however, remains independent of the direction of the operation and extends over both possible boundaries of the operation.

Attaching the laser scanning sensor above the edge of the crop being harvested illustrated in EP 0 878 121 A and recognizing the crop edge, the plowed furrow, or the edge of a windrow is particularly simple. However, attaching the scanning sensor to the operating implement (harvesting platform) creates certain disadvantages. The scanning sensor is exposed to strong vibrations that can have a detrimental effect on the accuracy of the measurement. When the operating implement is transferred to a different utility vehicle, the sensor must be transferred from the operating implement to a new operating implement associated with the first utility vehicle. This transfer is time consuming and contains the possibility of damage to the sensor during each installation. By attaching the sensor to the side of the harvesting platform, the sensor can be easily damaged, for example, in headlands or along fence lines. Finally the crop edge or the guide line does not always lie on only one side of the operating implement. Frequently harvesting is performed alternately on the left and the right sides of the harvesting platform. That is not possible with the attachment directly above the crop edge with a single scanning sensor. If a laser scanning sensor used for the automatic steering is attached to the cab in order to avoid these disadvantages, it is problematic to recognize on which side (left or right) the edge of the harvesting crop is located. Furthermore, in the state of the art, the scanning angle region of the laser scanning sensor is fixed, so that it must be selected sufficiently large, so that it detects both the possible boundaries of the operation, but then it will deliver data only at a relatively low scanning rate, but it must be selected smaller in order to produce a higher scanning rate. Then the detection of both possible boundaries of the operation is no longer possible.

DE 197 43 884 A discloses an agricultural machine having an arrangement for recognizing, without contact, the boundaries of operation. The arrangement includes a scanning laser sensor which scans a surface located ahead of the agricultural machine. The boundary of operation is recognized on the basis of the propagation time and the intensity or the phase shift of the reflected radiation. It is proposed that the attachment position and/or the inclination of the sensor be varied manually or automatically, in order to avoid control differences brought about by the relative attachment position.

EP 1 002 455 discloses a scanning sensor whose position can be adjusted manually on a reference line or a reference point. The entire sensor unit is mechanically repositioned. The angular region that was scanned remains constant in each case.

SUMMARY OF THE INVENTION

It is an object of the present invention to provide an improved system for automatically steering a utility vehicle having an operating implement along a boundary of operation, where it does not matter if the boundary of operation is located on the left or the right side of the utility vehicle.

The automatic steering system comprises a scanning sensor that produces an output signal. The output signal is communicated to a controller. The controller is also supplied information communicating what side of the vehicle the boundary of operation is located. The controller uses the output signal to generate a steering signal that is communicated to a steering controller. In response to the steering signal, the steering controller steers the utility vehicle parallel to the boundary of operation. The controller uses the information to focus the scanning sensor on a particular scanning region located on the side of the vehicle where the boundary of operation is located.

The scanning region of the scanning sensor is controlled as a function of the information revealing which side of the utility vehicle the boundary of operation is located. If the information reveals that the boundary of operation is located on the right side, the controller will order the scanning arrangement to scan, at least over the greatest proportion of time, a region located on the right side of the operating implement. Analogously the left side is scanned primarily, if the boundary of operation is located there. This is performed either internally within the sensor by changing the position of lenses, transmitter and receiver or by rotating the entire scanning sensor. In this way the scanning sensor does not need to scan the entire region ahead of the utility vehicle, but only a limited region. As a rule the scanning sensor is a laser scanning sensor operating in an optical mode, that is well known in the art. A laser scanning sensor with a movable mirror can also be used. But it is also conceivable that a camera based image processing system may also be used. In this case the position of the camera and/or the focal length of its objective can be varied by the controller. Alternatively or in addition, the proportion of the signal delivered by the scanning sensor that is evaluated can be varied by the controller. Within the framework of the present invention, the boundary of operation is understood to include every sort of boundary between one region of a field that was already processed (for example, plowed, mowed, fertilized, harvested etc.) and a region that was not processed or a region at the edge of the field that was not to be processed at all.

As the scanning region has been limited to the side of the vehicle along which the boundary of operation is located, the position data can be taken up by the scanning sensor at higher scanning rates, resulting in better control performance at higher velocities. The scanning sensor should be located to scan either side of the vehicle, therefore it is desirable that it be located in the vicinity of the longitudinal centerline of the utility vehicle. The operator's cab is constructed in such a way that the operator can monitor the operation of the utility vehicle and the operating implement; therefore a favorable location is in the vicinity of the head of the operator. By attaching the scanning sensor to the operator's cab, vibrations are sharply reduced and simultaneously the scanning sensor is protected against damage.

If the controller is provided with information on which side the boundary of operation is located, the controller orders the scanning sensor to initially scan a more or less wide region around the sideways limit of the operating implement. However, on occasion the boundary of operation is not located at the edge of the operating implement, so that the scanning sensor will not necessarily encounter the boundary of operation. In this situation, the controller orders the scanning sensor to scan the expected location of the boundary of operation. In this way the scanning region is limited to a region about the expected location of the boundary of operation, so that the boundary of operation can always be recognized optimally. For this purpose the scanning sensor can be changed in its orientation and/or the scanning region can be reduced, increased or shifted symmetrically or asymmetrically to the boundary of operation. At that time the scanning region of the scanning sensor is preferably established as a function of the velocity. At high velocity a high scanning rate is appropriate, but also a wide field of view. There will be a compromise between these requirements, in order to attain optimal steering. Furthermore the scanning sensor can be repositioned in such a way that the distance between the scanning sensor and the measurement point on the field (point of reflection) is a function of the velocity. Thereby a measurement that looks ahead corresponding to the reaction time of the utility vehicle is possible even at higher velocities. An automatic variation of the scanning angle region of the scanning sensor is possible independent of the automatic identification of the side on which the boundary of operation is located, in order, for example, to have the scanning sensor comply with differing operating implements, with which, on occasion, differing measurement distances and hence differing scanning angle regions are useful.

The present invention can use a variety of methods or sensors for generating information on which side of the utility vehicle the boundary of operation is located, and/or at which distance from the longitudinal centerline of the utility vehicle it is located. This information can be supplied manually by an operator through a switch, a potentiometer and/or a keyboard that is in communication with the controller. Such simple manual inputs saves the high cost of sensors.

It is also conceivable that the output signals of the scanning sensor be used for the determination of the side and/or the position of the boundary of operation. In a first sequence covering a relatively large angular region, a first large angle detection run is made, from which the side or the position of the boundary of operation is derived, which can be recognized on the basis of a step-wise change in the height or the distance in the output signal of the position sensor. Following this the angular region is reduced to the side that was detected or to an interval about the expected position of the boundary of operation relative to the vehicle. If at the end of a field or, for example, after passing through a stand of lodged crop or rounding a relatively sharp curve the boundary of operation could not be recognized for a period of time, the sequence can be run automatically with a large angular region upon a manual input from the operator or upon a signal transmitted by the scanning sensor, that indicates that the boundary of operation can no longer be detected.

The wandering of the boundary of operation out of the scanning region of the sensor when operating around a curve, for example, can be prevented if the orientation of the sensor is made to automatically track the boundary of operation. This tracking arrangement can be controlled by the controller in such a way that the boundary of operation is always recognized optimally. The tracking of the detection is particularly useful when the scanning region of the sensor is narrowed, for example, in order to attain a high scanning rate at high velocities.

The simplest way to limit the scanning region is to narrow the angular region symmetrically about the centerline of the sensor. A somewhat more costly arrangement consists of reducing the scanning region symmetrically about the position of the edge of the stand of the crop. In this way the guidance of the sensor along the boundary of operation can be simplified or even omitted entirely. A reduction of the scanning region can be initiated and controlled by the controller as well as the control unit of the sensor.

In addition or as an alternative, the controller may receive information about the side and/or the position of the boundary of operation from an external data source. For example, information about the width of the operating implement or in the case of an asymmetric operating implement information about the distance of its left and right boundary from the centerline of the operating implement may be stored in memory. Most appropriately the memory unit is arranged physically on the operating implement, and is connected by a bus to the controller for transmitting data. In this way the controller is provided with actual information on the location of the left and the right boundary of the operating implement. This simplifies determining the expected location of the boundary of operation when merged with information about the respective side of the operation.

An external data source in the form of a position sensor, in particular a receiver of satellite signals, an inertial navigation sensor and/or a movement sensor may be in communication with the controller. On the basis of the operating path covered so far recorded by the position sensor, a determination of the side and/or the position of the boundary of operation is possible. If, for example, the headland is harvested at the beginning of the harvesting operation that harvesting path establishes the outline of the field to the controller. The position data also can be used to identify which portions of the field have been harvested. This information can be used in connection with the immediate position of the vehicle known from the position sensor, to predict the position of the boundary of operation, particularly if the scanning sensor can no longer recognize any boundary of operation, for example, during operation around curves or lodged crop. This information can be used even upon entry onto the field in order to recognize the side or the position of the boundary of operation, in connection with a stored map, and to orient the scanning sensor accordingly. The prediction of the boundary of operation as defined by a crop edge is based on the assumption that path of the operation is constant and extends parallel to a neighboring track. Only corresponding edges are used by the scanning sensor as the possible boundary of the crop edge. Edges that extend at an angle or at an implausible spacing that are recorded by the scanning sensor are ignored. In order to recognize edges that extend at an angle, all edges detected are stored in memory for a certain period of time, so that their courses can be recognized. In this way the scanning angle region of the scanning sensor can be reduced under program control. During the reduction of the scanning angle region, the quality of the position data must be considered. For that reason the reliability of the position data is constantly rechecked and reconsidered. Furthermore, the position sensor can be used as a back-up system for the scanning sensor.

The position sensor may be a known width of cut sensor that is attached to a cutter head that may operate, for example, ultra-sonic or capacitive sensors, that is arranged to recognize the position of the boundary of the crop. Such a width of cut sensor is disclosed in WO 00/08484.

DETAILED DESCRIPTION

Figure 1:
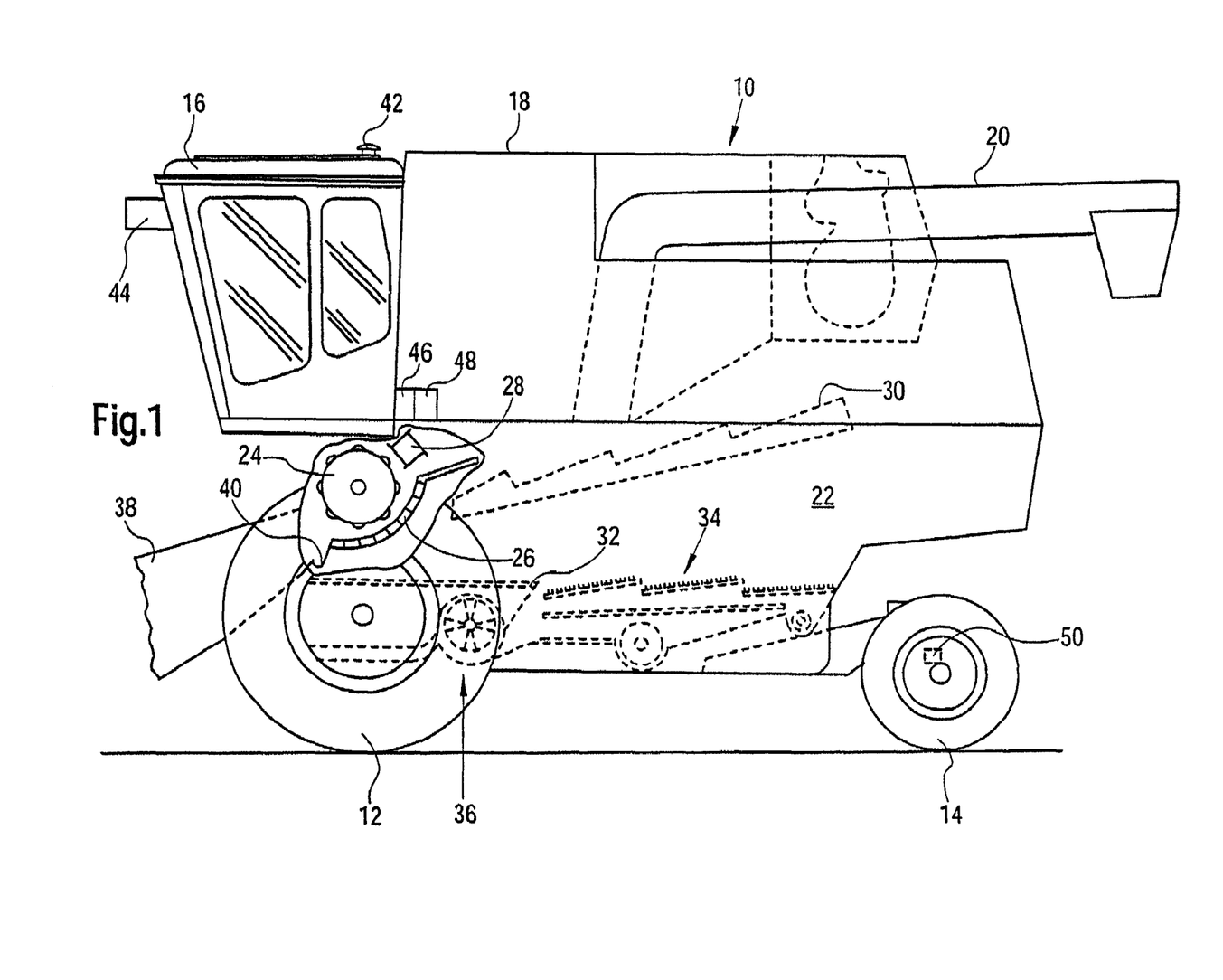
FIG. 1 is a semi-schematic side view of a utility vehicle with an automatic steering system.

The utility vehicle 10, illustrated in FIG. 1, is an agricultural combine. The combine is supported on front driven and rear steerable wheels 12 and 14, respectively, and is provided with an operator's cab 16 from which it is controlled by an operator. The present invention could also be used on other utility vehicles, such as, self propelled forage harvesters, self-propelled large balers and tractors having ground engaging implements or seeding machines. A grain tank 18 is located behind the operator's cab 16. The grain tank 18 is used for temporarily storing clean grain until it is transferred to a grain cart or truck by unloading auger 20. The grain tank 18 is supported on a frame 22 formed by two side sheets. The harvested crop is separated into its large and small components within the side sheets. The crop is first harvested by a harvesting assembly 64 (See FIG. 3) and from the harvesting assembly 64 the harvested crop is directed to a feeder house 38. The feeder house 38 is an upwardly sloping conveyor which conveys the harvested crop past a stone trap 40 to a threshing assembly. The threshing assembly comprises a threshing cylinder 24 with associated concave 26 and a beater 28. The threshed crop material is transferred to a separation assembly comprising straw walkers 30 which expand the threshed crop mat to release grain trapped in this mat. Clean grain and chaff falling from the concave 26 and the straw walkers 30 is directed to a grain pan 32. Crop material other than grain is expelled over the rear of the straw walkers 30 and out of the combine. The grain pan 32 directs the clean grain and chaff to a cleaning assembly which comprises sieves 34 and a cleaning fan 36. The cleaning fan 36 blows the chaff out the rear of the combine, whereas the clean grain falls downwardly and is collected on the floor of the combine. The clean grain is transferred upwardly by a clean grain elevator to the grain tank 18.

The roof of the operator's cab 16 is provided with a first position sensor 42. The first position sensor is an antenna for the reception of GPS signals. Although this sensor is located on the roof of the operator's cab 16, it may be located at any position on the combine where it would receive a good GPS signal.

The front of the operator's cab 16 is provided with a second position sensor 44. The second position sensor 44 has a transmitter for emitting laser radiation which reaches the ground approximately 10 meters ahead of the vehicle 10. The laser radiation is reflected back from the ground or crop to the sensor 44 which is also provided with a receiver for receiving this reflected radiation. The distance to the reflection point from the sensor 44 is determined by the propagation time of the laser radiation to be received by the receiver. The second position sensor 44 is pivoted about an approximately vertical axis, in order to scan a region transverse to the direction of forward movement of the vehicle 10. The signal of the receiver makes it possible to establish the angle between the forward operating direction and the position of the boundary of standing crop. Such position sensors 44 are known and are described, for example, in U.S. Pat. Nos. 6,095,254, and 6,101,795, whose disclosures are incorporated herein by reference. There is a possibility of using a laser distance sensor in which the transmitter and receiver are not rotated, but a mirror rotating step-by-step or continuously is used to scan the visible region. It can scan an angular region of up to 180°. Such sensors are available from Sick A. G., D-72796, Reute, under the designation LMS.

The first position sensor 42 and the second position sensor 44 communicate over a bus 52 with a controller 46 having a memory 48. The controller 46 supplies a steering signal to a steering controller 50. The steering controller 50 is used for controlling the steering angle of the rear steerable wheels 14. The controller 46 also communicates over the bus 52 with a memory 70, that is associated with the harvesting assembly 64. The memory 70 contains information about the operating width of the harvesting assembly 64. That portion of the bus 52 located on the harvesting assembly 64 is connected over a plug-in connection with the remaining portion of the bus 52 located on the vehicle 10. When the harvesting assembly 64 is detached from the vehicle 10, the portion of the bus 52 located on the harvesting assembly 64 is also detached.

The controller 46 may also be supplied information about the side on which the boundary of operation is located or additional information about the expected location of the boundary of operation manually from the operator. This information and/or additional information is transmitted to the controller 46 by an input 72 locate in the operator's cab 16. The input can be a simple switch, potentiometer or key board.

Figure 2:
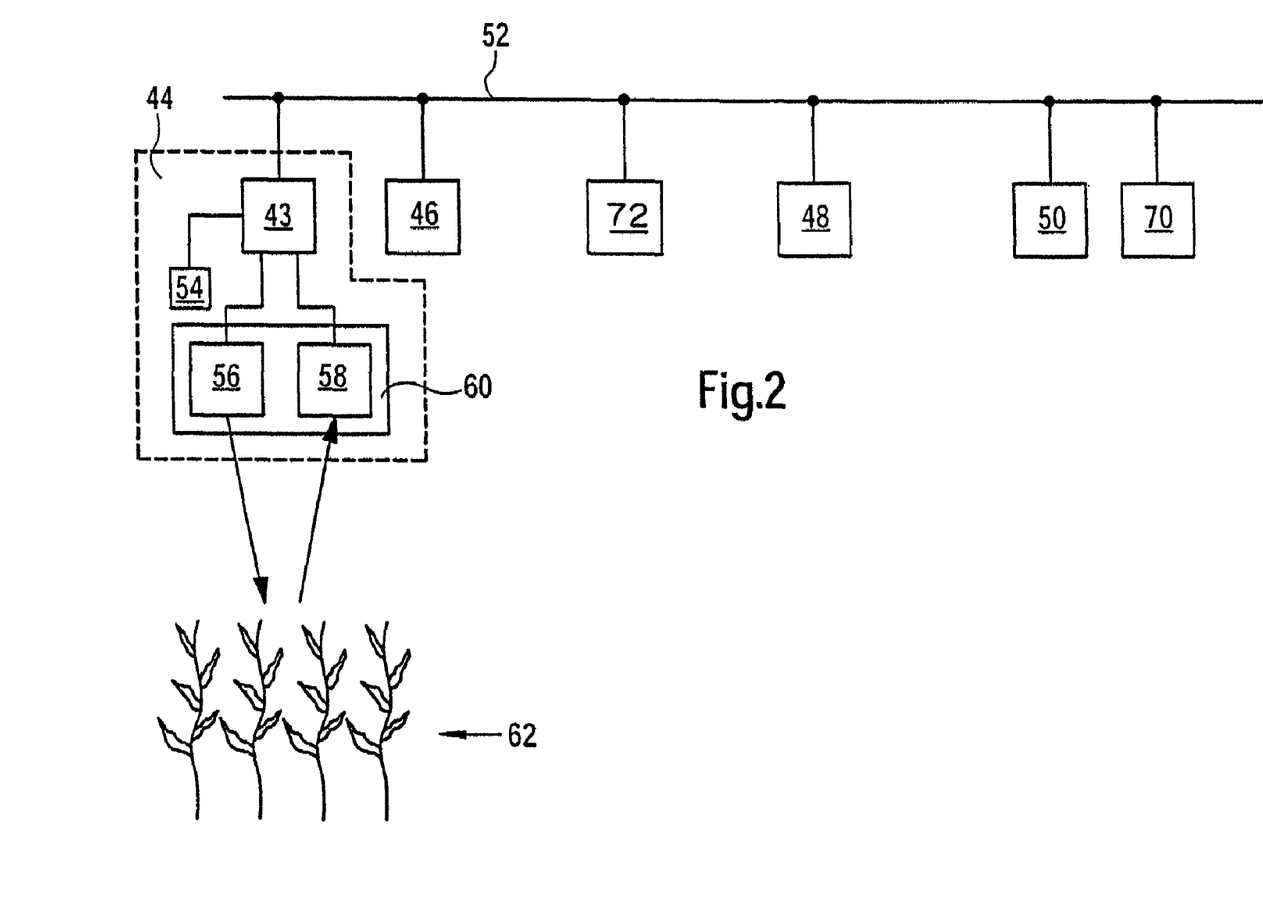
FIG. 2 is a block diagram of the automatic steering system.

As illustrated in FIG. 2, the scanning sensor 44, the controller 46, the steering controller 50 and the memory 48 are connected over a bus 52. The bus 52 may be a CAN-bus or an LBS-bus.

The scanning sensor 44 includes a scanning sensor control 43, that is connected to a transmitter 56, a receiver 58 and a pivoting motor 54. The transmitted 56 and the receiver 58 are arranged on a pivoting table 60 that can be pivoted back and forth by the pivoting motor 54 about an approximately vertical axis that is inclined slightly forward. The electromagnetic (light) radiation emitted by the transmitter 56 may lie in the visible range, above the visible range, or below the visible range. The electromagnetic radiation reaches the ground at a distance of several meters (for example, 10 meters) ahead of the harvesting assembly 64. The receiver 58 detects the radiation emitted by the transmitter 56 that was reflected by the ground or, by plants 62 standing on the ground, or by other objects. Since the radiation emitted by the transmitter 56 is amplitude modulated, the distance between the laser measurement arrangement 44 and the point at which the radiation is reflected can be measured by identifying the propagation time. The pivoting motor 54 is a stepper motor and pivots the pivoting table 60 back and forth about the axis continuously through an arc pre-set by the controller 46. At each pivot angle the scanning sensor controller 43 measures distance and the respective angle of the pivoting table 60 to the point of reflected radiation received by the receiver 58 and communicates this information in the form of an output signal to the controller 46. Following this, the pivoting motor 54 is activated and the pivoting table 60 brought into a new angular position where a new output signal is generated and communicated with the controller 46.

The scanning sensor controller 43 can directly calculate the immediate angle of the pivoting table 60, since it controls the pivoting motor 54. It would also be possible to use a separate sensor for detecting the pivot angle so that the stepper motor could be replaced by any desired motor. If a scanning sensor with a pivoting mirror is employed, the pivoting motor is used to run through the pivoting range of the mirror.

Figure 3:
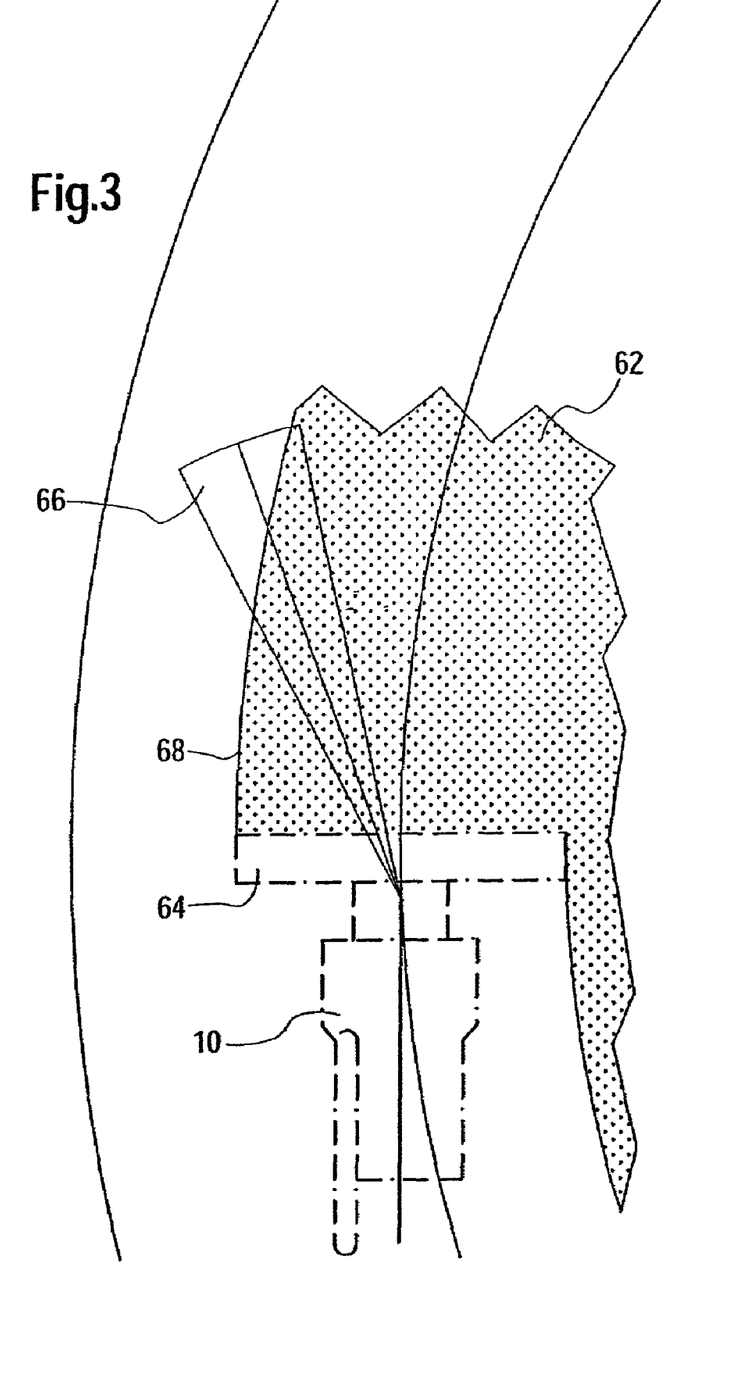
FIG. 3 is a plan view of the utility vehicle during the harvesting operation.

FIG. 3 is a plan view of the vehicle 10 during a harvesting operation. The harvesting assembly 64 is a harvesting platform, that cuts the plants (cereal crop) from the field. Numerical designator 68 characterizes the boundary of operation between the previously harvested proportion of the field and the plants 62 that are still to be harvested. This boundary of operation is also known as a crop edge. The angular region covered by the scanning sensor 44 is scanning region 66. It can be seen that the right portion of the scanning region 66 overlaps the boundary of operation 68. Furthermore, it can be seen that a time delay exists between the measurement of the position of the boundary of operation 68 and the point in time at which the vehicle 10 reaches the measurement point. This time delay must be considered in providing a steering signal to the steering controller 50.

Figure 4:
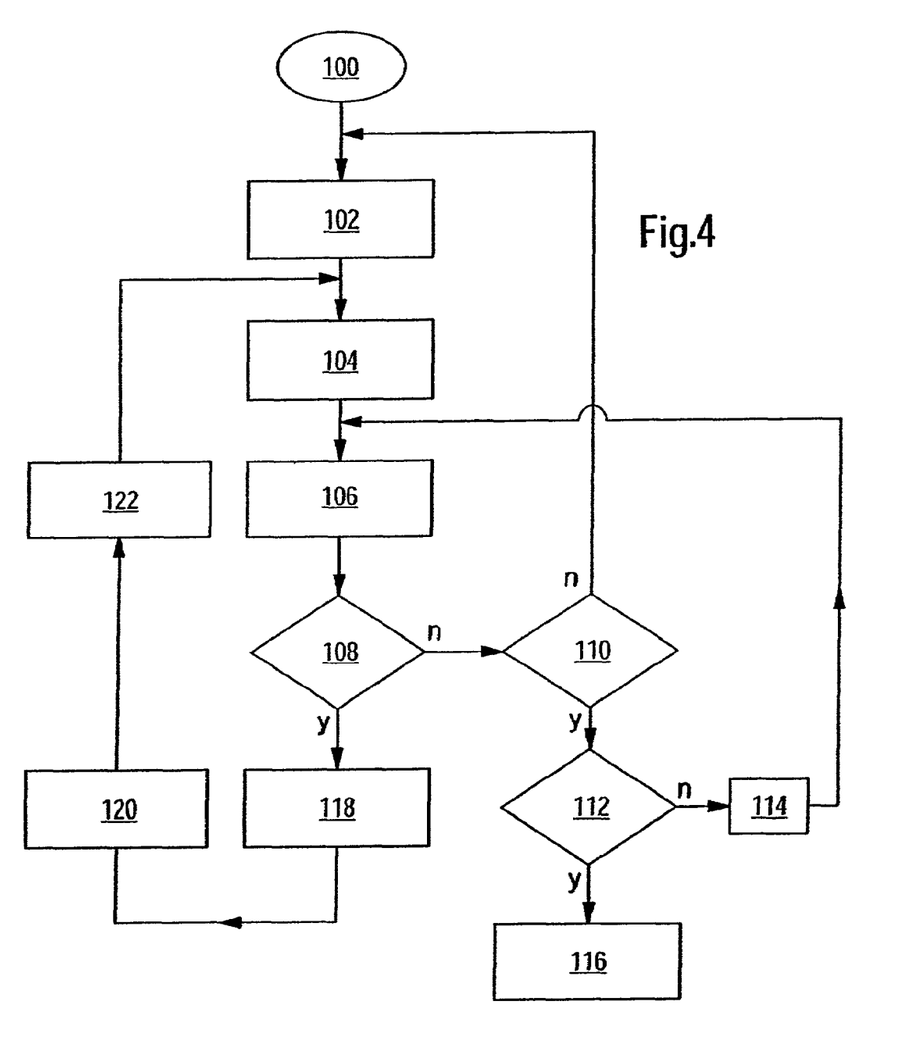
FIG. 4 is a flow chart showing the operation of the automatic steering system.

FIG. 4 shows a flow chart illustrating the operation of the controller 46. Step 100 starts the operation. In step 102 the side on which the boundary of operation is located and the expected position of the boundary of operation 68 relative to the vehicle 10 is identified. For this purpose the actual position of the vehicle 10 is determined with the position sensor 42 and compared with a digital map of the field to be harvested that is stored in the memory arrangement 48. From this information the side and the expected position of the boundary of operation relative to the utility vehicle is determined in connection with the operating width of the harvesting assembly 64 that is stored in memory 70.

In the next step 104, the controller 46 orders the scanning sensor controller 43 to scan a (relatively small) scanning region around the expected position of the boundary of operation. The scanning sensor controller 43 is supplied with information about the left and the right boundary of the scanning region and an order to perform a scan. At that time distance measuring values that depend on the pivot angle are recorded, which are a function of the propagation time of the radiation.

In the following step 106, the controller 46 identifies a step in the distance measurement values that were received and associates the pivot angle associated with the step detected by the scanning sensor with the boundary of operation. If several steps are found, the correct boundary of operation is identified on the basis of the map stored in the memory 48, the position derived from the position signal of the position sensor 42 and the path previously covered that was stored in the memory 48. Step 106 also determines whether a step and thereby a boundary of operation was detected at all.

Step 108 asks the question whether a boundary of operation was identified at all. If the result is positive the controller 46 proceeds to step 118. At step 118 the controller 46 communicates a steering signal to the steering controller 50. The steering signal is generated from the boundary of operation detected by the scanning sensor 44 and the operating width of the harvesting assembly 64 communicated by the memory 70, so that the vehicle 10 is guided along the boundary of operation for optimum utilization of the width of the harvesting assembly 64. The controller 46 before communicating the steering signal takes into account the time delay between the detection of a point with the scanning sensor 44 and the time the utility vehicle 10 reaches that point. In step 120 a new scanning region is established around the boundary of operation identified in step 106. After that information about the position of the vehicle 10 at that point in time, is stored in the memory 48 in step 122. Step 104 again follows in which the new scanning region is scanned.

If the answer to the question in step 108 is no, the controller 46 proceeds to step 110. Step 110 asks the question whether the scanning process performed in the step 106 was based on the calculation of step 102. If that is not the case, then there is the possibility that the boundary of operation has reached beyond the visible range of the scanning sensor 44, that may, for example, occur during operation around a curve (see FIG. 3), with lodged grain crop or at the headlands. Therefore the controller 46 proceeds to step 102 in which the attempt is made to identify the possible position of the boundary of operation by means of the position data of the position sensor 42.

In case the scanning process in the preceding step 106 is based on the calculation in step 102, there is the possibility that errors may have occurred in step 102, for example, inaccurate position data in the position sensor 42 or an erroneous map in the memory arrangement 48. If step 110 shows that the scan was based on step 102, then step 112 follows, in which the question is posed whether the maximum possible scanning region has been scanned already. If that is the case then no further enlargement of the scanning region is possible. Since an error must exist, an error message is transmitted in step 116, and the vehicle can be operated manually.

If step 112 indicates that the maximum angular region has not yet been scanned, step 114 follows, in which the controller 46 orders the scanning controller 43 to scan a larger scanning region. Step 114 is followed by step 106.

Having described the preferred embodiment, it will become apparent that various modifications can be made without departing from the scope of the invention as defined in the accompanying claims.

I claim:

1. A system for automatically steering a utility vehicle equipped with an operating implement, the system comprising:
   a scanning sensor mounted to the utility vehicle, the scanning sensor having a scanning region, the scanning sensor generating an output signal;
   a controller in communication with the scanning sensor for receiving the output signal and generating a steering signal based on the output signal of the scanning sensor so as to automatically guide the vehicle along a boundary of operation detected by the scanning sensor;
   a steering controller for steering the vehicle, the steering controller in communication with the controller for receiving the steering signal;
   the controller being supplied with information on which side of the operating implement the boundary of operation is located and in response to this information the controller controls the scanning region of the scanning sensor,
   wherein the controller changes the scanning region of the scanning sensor by steering the scanning region with respect to the vehicle as a function of the information and additional information indicating an expected location of the boundary of operation and wherein the controller has a memory that stores the expected location of the boundary of operation.

2. A system as defined by claim 1 wherein the scanning region of the scanning sensor is controlled in such a way that the scanning region is reduced about the boundary of operation.

3. A system as defined by claim 1 wherein the scanning region of the scanning sensor is controlled in such a way that the scanning region is enlarged about the boundary of operation.

4. A system as defined by claim 1 wherein the scanning region of the scanning sensor is controlled in such a way that the scanning region is shifted about the boundary of operation.

5. A system as defined by claim 4 wherein the scanning region of the scanning sensor is controlled in such a way that the scanning region is shifted symmetrically about the boundary of operation.

6. A system as defined by claim 4 wherein the scanning region of the scanning sensor is controlled in such a way that the scanning region is shifted asymmetrically about the boundary of operation.

7. A system as defined by claim 1 wherein the operating implement has sides and the controller limits the scanning region of the scanning sensor to a scanning region about one of the sides of the operating implement.

8. A system as defined by claim 1 wherein the controller is manually supplied with information about which side the boundary of operation is located relative to the operating implement.

9. A system as defined by claim 8 wherein the controller is manually supplied with information about the expected location of the boundary of operation.

10. A system as defined by claim 1 wherein the controller derives the information about which side of the boundary of operation is located relative to the operating implement from the output signal of the scanning sensor.

11. A system as defined by claim 10 wherein the controller derives the information about the expected location of the boundary of operation from the output signal of the scanning sensor.

12. A system as defined by claim 1 wherein the controller derives the additional information about the expected location of the boundary of operation from data supplied by a position sensor.

13. A system as defined by claim 12 wherein the position sensor is a satellite signal receiver.

14. A system as defined by claim 12 wherein the controller derives a previously traveled path by the utility vehicle from position signals of the position sensor that are stored in a memory, the controller derives the expected location of the boundary of operation from the previously traveled path.

15. A system for automatically steering a utility vehicle equipped with an operating implement and having an operating velocity, the system comprising:
    a scanning sensor mounted to the utility vehicle, the scanning sensor having a scanning region, the scanning sensor generating an output signal;
    a controller in communication with the scanning sensor for receiving the output signal and generating a steering signal based on the output signal of the scanning sensor so as to automatically guide the vehicle along a boundary of operation detected by the scanning sensor;
    a steering controller for steering the vehicle, the steering controller is in communication with the controller for receiving the steering signal;
    the controller being supplied with information on which side of the operating implement the boundary of operation is located and in response to this information the controller controls the scanning region of the scanning sensor,
    wherein the controller further controls the scanning region of the scanning sensor as a function of the velocity.

16. A system as defined by claim 15 wherein the scanning sensor makes a measurement of a point in the scanning region, at a point of time and a distance from the scanning sensor, the scanning sensor is controlled in such a way that the distance is a function of the velocity in order to obtain a nearly constant time delay between the point in time the measurement was taken and that of the utility vehicle reaching the point in the field.

17. A system for automatically steering a utility vehicle equipped with an operating implement, the system comprising:
    a scanning sensor mounted to the utility vehicle, the scanning sensor having a scanning region, the scanning sensor generating an output signal;
    a controller in communication with the scanning sensor for receiving the output signal and generating a steering signal based on the output signal of the scanning sensor so as to automatically guide the vehicle alone a boundary of operation detected by the scanning sensor;
    a steering controller for steering the vehicle, the steering controller in communication with the controller for receiving the steering signal;
    the controller being supplied with information on which side of the operating implement the boundary of operation is located and in response to this information the controller controls the scanning region of the scanning sensor,
    wherein the controller changes the scanning region of the scanning as a function of the information and additional information indicating an expected location of the boundary of operation and wherein the controller has a memory that stores the expected location of the boundary of operation wherein the controller derives the additional information about the expected location of the boundary of operation from data supplied by an operating implement memory located on the operating implement.

18. A system as defined by claim 17 wherein the operating implement has a width and the operating implement memory contains information about the width of the operating implement.

19. A system for automatically steering a utility vehicle equipped with an operating implement, the system comprising:
- a scanning sensor mounted to the utility vehicle, the scanning sensor having a scanning region, the scanning sensor generating an output signal;
- a controller in communication with the scanning sensor for receiving the output signal and generating a steering signal based on the output signal of the scanning sensor so as to automatically guide the vehicle along a boundary of operation detected by the scanning sensor;
- a steering controller for steering the vehicle, the steering controller in communication with the controller for receiving the steering signal:
- the controller being supplied with information on which side of the operating implement the boundary of operation is located and in response to this information the controller controls the scanning region of the scanning sensor, wherein the controller chances the scanning region of the scanning as a function of the information and additional information indicating an expected location of the boundary of operation and wherein the controller has a memory that stores the expected location of the boundary of operation wherein the controller derives the additional information about the expected location of the boundary of operation from data supplied by a position sensor wherein position sensor is a width of cut sensor.

* * * * *